United States Patent
Qureshi et al.

(10) Patent No.: US 6,895,489 B2
(45) Date of Patent: May 17, 2005

(54) SYSTEM AND METHOD FOR OPERATING IN ENDIAN INDEPENDENT MODE

(75) Inventors: Shiraz A. Qureshi, Roseville, CA (US); Martin O. Nicholes, Antelope, CA (US); Sachin N. Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 10/212,740

(22) Filed: Aug. 7, 2002

(65) Prior Publication Data

US 2004/0030856 A1 Feb. 12, 2004

(51) Int. Cl.⁷ ............................................. G06F 12/00
(52) U.S. Cl. ..................... 711/202; 711/217; 712/229
(58) Field of Search .............................. 711/202, 217; 712/1, 229; 713/2, 100

(56) References Cited

U.S. PATENT DOCUMENTS

| | | | |
|---|---|---|---|
| 5,408,664 A | * | 4/1995 | Zarrin et al. ................... 713/2 |
| 5,524,245 A | * | 6/1996 | Zarrin et al. ................... 713/2 |
| 5,781,763 A | | 7/1998 | Beukema et al. |
| 5,819,117 A | | 10/1998 | Hansen |
| 5,928,349 A | * | 7/1999 | Loen et al. ..................... 712/1 |
| 5,937,170 A | * | 8/1999 | Bedarida ..................... 710/100 |
| 6,021,275 A | | 2/2000 | Horwat |
| 6,157,955 A | | 12/2000 | Narad et al. |
| 6,388,586 B1 | | 5/2002 | Fischer et al. |
| 6,401,117 B1 | | 6/2002 | Narad et al. |
| 2004/0054844 A1 | * | 3/2004 | Kirsch ........................... 711/1 |

OTHER PUBLICATIONS

Intel IXP4XX Product Line of Newtork Processor and IXC1100 Control Plane Processor: Understanding Big Endian and Littel Endian Modes, Dec. 2003, document No. 25437–001.*

Intel XScale Microarchitecture, Technical Summary, 2000.*

Search Report issued on Jan. 20, 2004 in counterpart foreign application in GB under application No. 317112.1.

* cited by examiner

Primary Examiner—Christian P. Chace

(57) ABSTRACT

The present system and method allows for a memory location, typically a system event register, present in a processor to be accessed as either big or little endian mode, depending on an operating system (OS) accessible bit for endian selection. The OS type is determined at boot time.

11 Claims, 4 Drawing Sheets

|  | 301 |  |  | 303 |
|---|---|---|---|---|
| Addr | 0 | 1 | 2 | 3 |
| Byte - Order | LSB | LSB - 1 | LSB - 2 | MSB |
| Addr X | X | X + 1 | X + 2 | X + 3 |
| Contents | 9E | 05 | CD | AB |

SYSTEM AND METHOD FOR OPERATING IN ENDIAN INDEPENDENT MODE

BACKGROUND

In current practice, the computer architecture of different computers allows for access of system event registers in two conflicting manners. Assuming that a system register is one word of data, four bytes long, the register can be organized with the most significant byte in the lowest memory address or the highest memory address. In a multi-byte memory block, "big endian" stores the most significant byte (MSB) in the lowest memory address, which is the address of the data. "Little endian" stores the least significant byte (LSB) in the lowest memory address, which is the address of the data.

Different processors are capable of operation in either big or little endian mode. Some processors are capable of operation in either mode, depending on the operating system, or other criteria. The boot-up firmware (BIOS) must know and define in which mode the processor is to operate. Thus, in the current practice, the firmware for a given computer must be customized to read/write memory according to the corresponding architecture, i.e., big endian or little endian.

For example, the Itanium® Processor Family, from Intel® Corporation, is endian agnostic, i.e., it can operate in either big endian or little endian mode. Itanium® processors running Microsoft™ Windows™, available from Microsoft Corporation, and Linux, available free from a number of sources, operate in little endian mode. HP-UX, available from Hewlett-Packard Company, operates in big endian mode.

SUMMARY

The present system and method allows for the system event register present in a processor, or other location of memory, to be accessed as either big or little endian registers depending on an operating system (OS) accessible bit for endian selection. The endian selection register is written during system boot up and is used by the address decode logic to determine in what order to read/write/select the multiple bytes of an endian accessible memory location.

The endian selection register contains a flag to indicate in which mode (big or little endian) to operate. This flag is operating system and processor dependent. An address is sent to the address decode logic corresponding to an endian accessible memory block. The decode logic uses the selected address and the endian selection register to remap the bytes of the selected address location so that the MSB and LSB are provided in the order expected by the operating system.

DESCRIPTION OF THE DRAWINGS

The detailed description will refer to the following drawings, wherein like numerals refer to like elements, and wherein.

DETAILED DESCRIPTION

Endian independent access to memory locations is desired so that one set of firmware can be used for multiple processors and/or operating systems. An operating system expects data to be retrieved in a specified byte-order. In present systems, the system firmware must be hard-coded as big or little endian. On computer systems based with endian agnostic processors such as the Itanium® Processor Family, the operating system (OS) decides how the data is retrieved from memory. The OS expects the system registers that it reads and writes to be the same endian as itself. For example, Microsoft® Windows™ is little endian and expects the registers it reads from the system to be little endian in nature. The present system and method is used to allow for both little and big endian operating systems to operate on a computer system based with endian agnostic processors. It will be apparent to one skilled in the art that the computer system may be any variety of computing devices, such as an embedded computer system, e.g., a network router; a stand-alone computer system; or a computer system connected to a network.

Figures 1, 2:
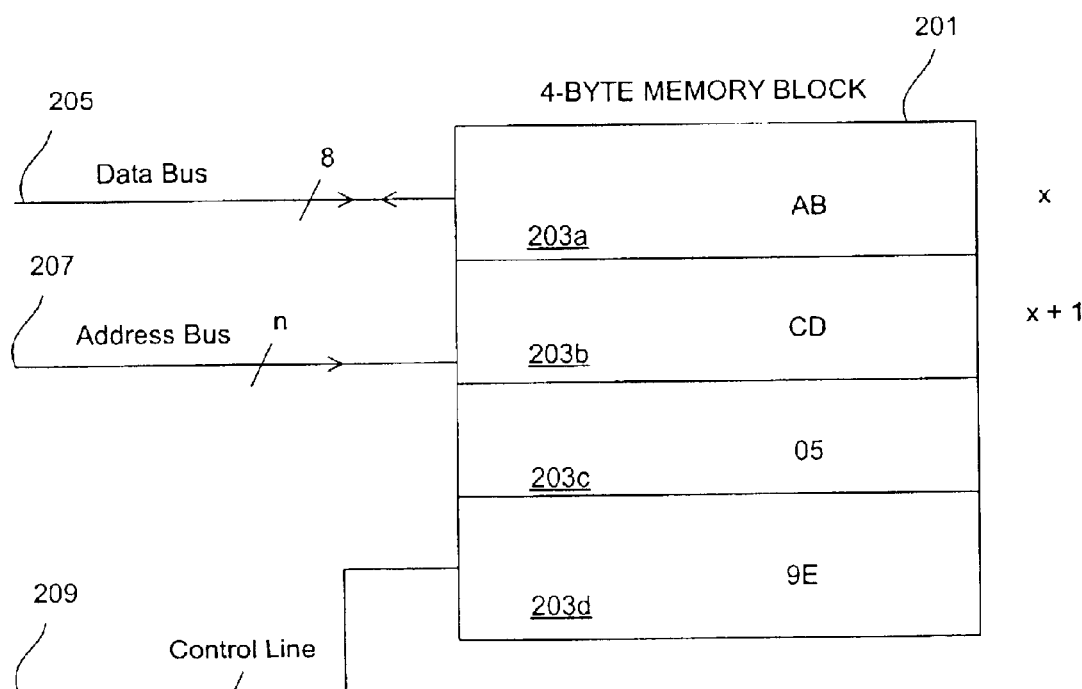
FIG. 1 shows a 4-byte word of data to be accessed in "big endian" mode.
FIG. 2 shows an exemplary memory block with four bytes of data.

Referring now to the drawings, and in particular to FIG. 1, there is shown a 4-byte word of data to be accessed in "big endian" mode. In this data word, the lowest memory address x, also designated by reference numeral 101, corresponds to the most significant byte (MSB) of data and the highest memory address x+3, also designated by reference numeral 103, corresponds to the least significant byte (LSB) of data. For example, assume that a 4-byte register contains the hexadecimal number ABCD059E. For simplicity, hexadecimal numbers are denoted by a preceding "0x", i.e., 0xABCD059E. If this were to be represented in big endian, the memory locations would contain data as shown in Table 1.

TABLE 1

| Big Endian Access | | | |
|---|---|---|---|
| x | x + 1 | x + 2 | x + 3 |
| 0xAB | 0xCD | 0x05 | 0x9E |

FIG. 2 shows a portion of an exemplary memory block 201, with four bytes of data, as indicated by reference numerals 203a–d. The memory is connected to an 8-bit databus 205, an n-bit address bus 207, and at least one control line 209. When a portion of memory is selected for reading or writing, the system must know in what order the bytes are to be read/written/selected. This is defined by the endianess of the system.

Figures 3, 4:
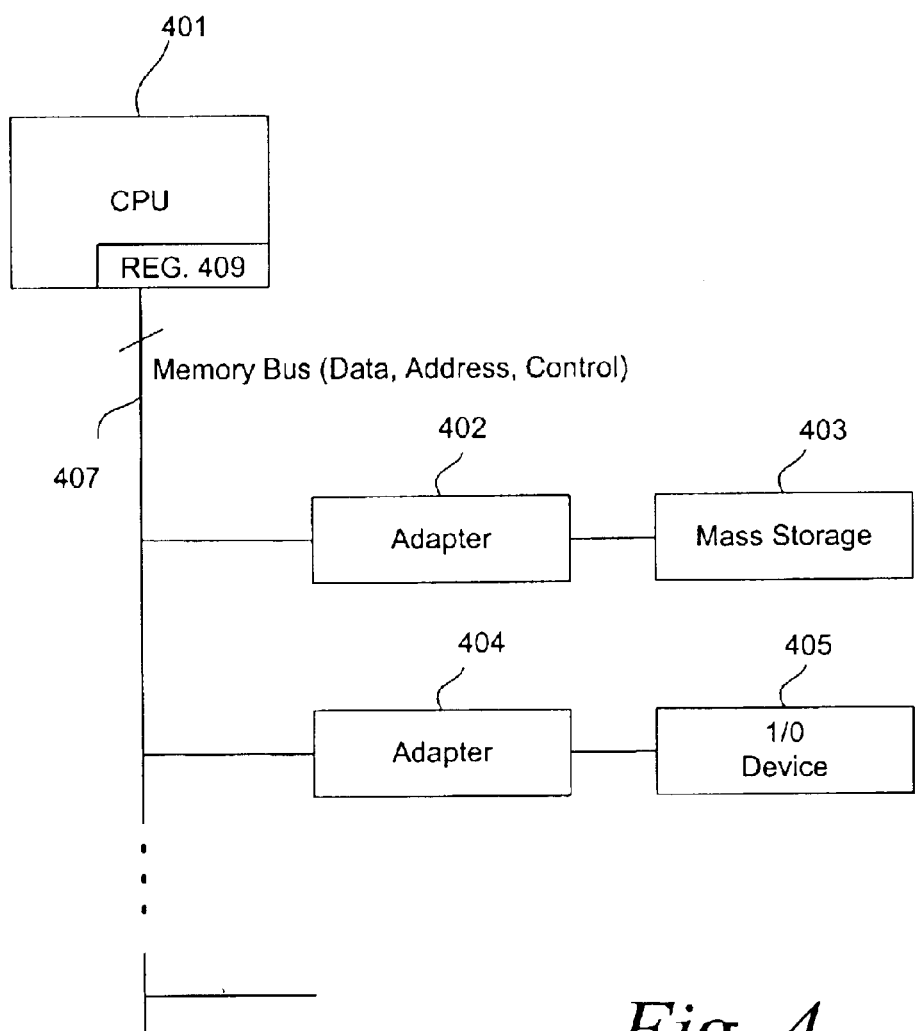
FIG. 3 shows a 4-byte word of data to be accessed in "little endian" mode
FIG. 4 shows a block diagram of a computer system with registers accessible in big or little endian mode.

For instance, FIG. 3 shows a 4-byte word of data to be accessed in little endian mode. In this data word, the lowest memory address x, also designated by reference numeral 301, corresponds to the least significant byte (LSB) of data and the highest memory address x+3, also designated by reference numeral 303, corresponds to the most significant byte (MSB) of data. It will be apparent to one skilled in the art that four bytes are illustrated here for simplicity, and that for the present invention, the data word is scalable to any number of bytes. Using the example above, in little endian, the register would contain data as shown in Table 2.

TABLE 2

| | Little Endian Access | | |
|---|---|---|---|
| x | x + 1 | x + 2 | x + 3 |
| 0x9E | 0x05 | 0xCD | 0xAB |

FIG. 4 shows a block diagram of a computer system encompassing the present system and method. A central processing unit (CPU) 401 is connected to mass storage 403 (via adapter 402) and an input/output (I/O) device 405 (via adapter 404), both adapters connected to the CPU via a memory bus 407. The memory bus 407 contains data, address and control information. The mass storage may be a hard disk drive or other memory area. The CPU 401 may be connected to any number of other peripherals or additional CPUs depending on its intended use. The memory space of the computer system may consists of anything that can be accessed by the memory box. A memory space is divided into memory mapped I/O space, I/O port space, etc. The CPU has a number of system event registers 409, typically residing on the chipset of the CPU motherboard.

Figure 5:
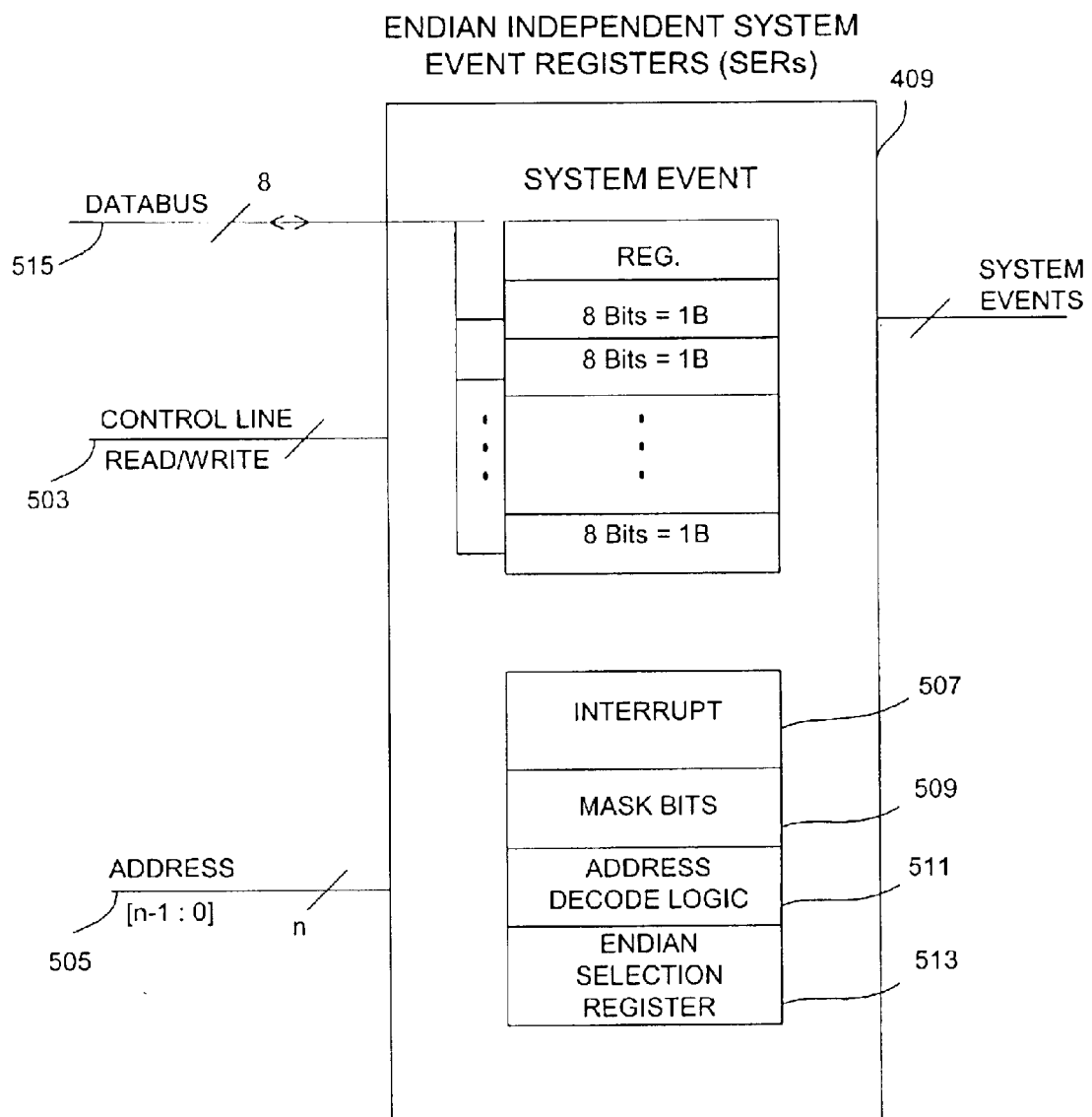
FIG. 5 shows a block diagram of an exemplary system for accessing endian independent system event registers (SERs)

FIG. 5 shows a block diagram of an exemplary system for accessing endian independent system event registers (SERs) 409. System event registers 409 in this example contain four 8-bit bytes and are typically located on the chipset of the CPU 401. It will be apparent to one skilled in the art that the present system and method will work for memory in any memory space, and is not limited to the chipset. Access to a given register 501 is controlled by the control line 503 and the address bus 505. As with any register, there is control logic for interrupts 507, mask bits 509, and for decoding the address 511. The present invention also includes an endian selection register 513 to define in what order the bytes are to be accessed/retrieved/written. In other words, the control signal 503 defines the type of access, the address bus 505 identifies the selected word of data, and the address decode logic 511 is a logic block which will take the address as an input in addition to the endian selection register 513. Based on the address and endian selection register, the address decode logic 511 generates the appropriate selects for the register 501. The control line 503, which identifies whether the bytes are to be selected, read, or written, and the address sent on the n-bit address line are combined with the flags in the endian selection register, so that based on the values set up in the endian selection, the address decode logic 511 will flip the way the addresses are set up, as described below.

The databus 515 can be a bi-directional bus, depending upon whether it is a read-only memory, or a read-write memory, or a write-only memory. The address bus 505 is a read-only bus for the memory. For example, a request travels along the address bus indicating it needs to access memory address x+2. The memory block will encode the physical address based on what the address is with respect to big endian or little endian and accordingly send out that data. Suppose that databus 515 is m bits wide. Each electronic chip in the product (computer) has a certain order in which it stores the bits or bytes. Assuming an 8-bit wide bus, one 8-bit byte is stored or accessed at a time. The order of the stored ore retrieved bytes is dependent on the endianess of the system.

The re-mapping between big and little endian is done by inverting the least significant bit in the address associated with the memory. This one-bit inversion technique works for 16-bit registers, or two 8-bit bytes. For a 32-bit register, the two most least significant bits are inverted. This algorithm scales to other register lengths as follows. Depending on the length of the register to convert from big endian to little endian (or vice-a-versa), the number of least significant bits to invert is 1 to n, where m is the number of bits in the register and $m=8\times 2^n$. For instance, for a 128-bit register, $m=128=$is $8\times 2^4$. Thus, $n=4$, so the number of bits to invert is 4. For a 64-bit register, $m=64=$is $8\times 2^3$. Thus, $n=3$. For a 1028-bit register, or memory location, $m=1024=8\times 128=8\times 2^7$. Thus, the number of bits to invert is 7. The minimum number of bits to invert is one, for instance for a 16-bit register. If the register is only 8-bits long, or one byte, then endian mode is not relevant, as long as the databus is 8-bits wide.

For example, an exemplary system event register is 32-bits long, or four 8-bit bytes. According to the algorithm described above, converting from little endian mode to big endian mode requires inversion of two bits. Four addresses are used to access the four bytes of the register. In this instance, suppose the desired address is 16-bits, or four nibbles (4-bits). Hexadecimal notation can be used to identify the binary address, for simplicity, and yield four hexadecimal digits. In this example, the address is 0xF0AC through 0xF0AE. The least significant bits in the address are relevant for inversion, so 0xC, 0xD, 0xE and 0xF are shown in Table 3 below. The least significant bits of 0xFA0C are 1100 (binary). The least significant bits of 0xF0AF are 1110 (binary). If the register is accessed in little endian mode, with the least significant byte accessed first, then the bytes are accessed in the order of 0xF0AC, 0xF0AD, 0xF0AE, and 0xF0AF. If the endian selection register indicates that the bytes are to be accessed in big endian order, then they are accessed as 0xF0AF, 0xF0AE, 0xF0AD, and 0xF0AC. Thus, for little endian mode, the least significant bits in the address are 1100(binary) and to access it in big endian, the two least significant bits are inverted to yield 1111, or 0xF0AF. Thus, as the address is sent to the address decode logic 511, the endian select register 513 is input to determine whether the address must be inverted, and how many bits, before the byte is accessed.

TABLE 3

| | | Address Inversion | | |
|---|---|---|---|---|
| Register address (in hex) | Least significant byte of address (in binary) | Little endian order | Big endian order | Inverted address |
| 0x F 0 A C | 1 1 00 | LSB | MSB | 1 1 11 |
| 0x F 0 A D | 1 1 01 | LSB + 1 | MSB − 1 | 1 1 10 |
| 0x F 0 A E | 1 1 10 | LSB + 2 | MSB − 2 | 1 1 01 |
| 0x F 0 A F | 1 1 11 | LSB + 3 (MSB) | MSB − 3 (LSB) | 1 1 00 |

Figure 6:
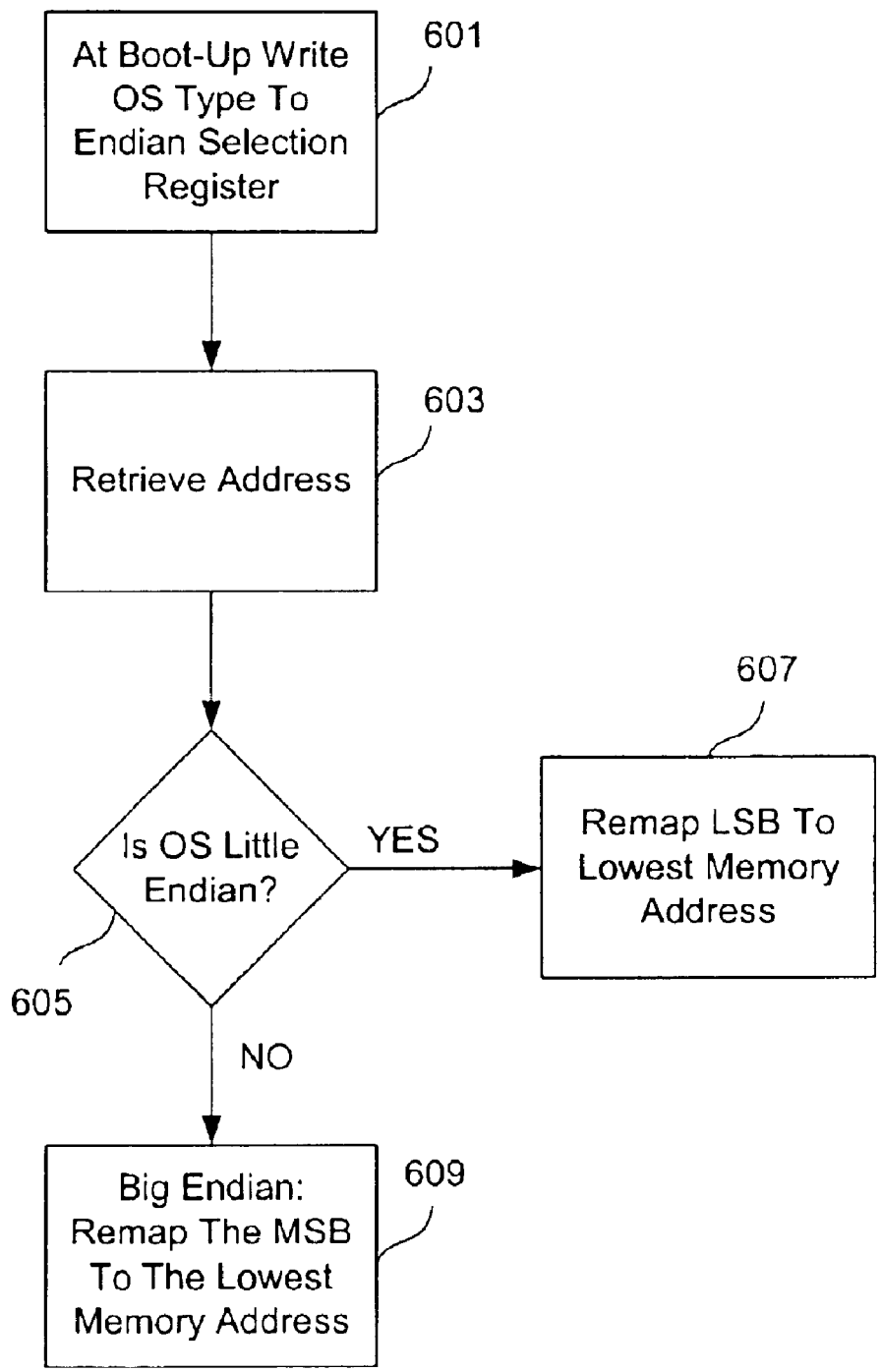
FIG. 6 is a flow chart illustrating a method for converting a big endian address to a little endian address.

Referring now to FIG. 6, there is shown a flow chart illustrating a method for converting a big endian address to a little endian address. During system boot-up, the OS loader writes the OS type to the endian selection register in step 601. The endian mode of a given OS is known, so a pre-defined table or list of types may be stored in the firmware and decoded into a flag for the endian selection register. Thus, the loader need not have the code for the endian flag pre-coded, but may merely perform a table look-up based on the OS type. Different processors using different hardware may implement the flag differently. Upon loading, the OS type is identified and an endian flag is determined and written to the endian selection register.

In the illustrative example, endian access is used for a system event register. It will be apparent to one skilled in the art that this technique can be used to access any type of memory that uses endian access. In the current example, a system event register is requested for access in step 603. A determination is made as to whether the OS is little endian using the endian selection flag, in step 605. If the OS is little endian, then the least significant byte (LSB) is remapped to the lowest memory address, in step 607. Otherwise, the memory is assumed to be big endian and the most significant byte (MSB) is remapped to the lowest memory address in step 609. The address is remapped, as described above, inverting n least significant bits of the address, according to $m=8\times2^n$, where m is the number of bits in the register.

What is claimed is:

1. An address decoder for accessing memory in big or little endian mode based on an operating system selected mode, comprising:

address decode logic corresponding to a memory block, the address decode logic determining a memory location in the memory block using input from an address line; and an endian selection register accessed by the address decode logic for determining an order to access bytes from the memory location in the memory block, wherein the address decode logic inverts at least one least significant bit of memory location address, and wherein n bits are inverted, n being equal to or greater than 1, where n is determined by m address bits such that $m=8\times2^n$, for an 8-bit data bus.

2. The address decoder as recited in claim 1, wherein the endian selection register is set at system boot time to correspond to a selected operating system.

3. The address decoder as recited in claim 1, wherein memory is accessible in big endian and little endian mode, determinable by the endian selection register, the endian selection register being set by an operating system at system boot time.

4. The address decoder as recited in claim 1, wherein the memory location corresponds to at least one system event register.

5. A method for translating endian independent memory access, the method comprising:

storing an operating system selected endian mode in an endian selection register upon system boot-up;

requesting access to a memory location in a memory block;

determining an endian mode required by the operating system, wherein the endian mode is selected from the group consisting of big endian mode and little endian mode;

remapping bytes of the memory location, wherein a least significant byte of the memory location is mapped to a lowest memory address for little endian mode and a most significant byte of the memory location is mapped to a lowest memory address for big endian mode and wherein the remapping bytes of the memory location further comprises:

for m address bits, determining n number of bits to invert, n being equal to or greater than 1, where $m=8\times2^n$, for an 8-bit data bus; and inverting n least significant bits of the memory location address to re-order access of each byte in the memory location.

6. The method as recited in claim 5, wherein the memory location corresponds to a system event register.

7. A computing device operating in endian independent mode, comprising:

a central processing unit (CPU) having memory;

a memory bus connecting the CPU with at least one device, wherein the memory bus comprises data, address and control information;

an endian selection register for storing an operating system determined endian mode;

a memory block in said memory, the memory block connected to the memory bus, the memory block having an address decode logic and access to the endian selection register, wherein the address decode logic uses the endian selection register to determine an order for bytes of memory to be sent along the memory bus as data information when a memory location has been identified in the address information sent to the memory block and wherein the address n being equal to or greater than 1, decode logic inverts n bits of a memory location address, where n is determined by m address bits such that $m=8\times2^n$. for an 8-bit memory bus.

8. The computing device as recited in claim 7, wherein the memory block corresponds to at least one system event register.

9. The computing device as recited in claim 8, wherein the at least one system event register resides on a system firmware chipset in the CPU.

10. The computing device is recited in claim 7, wherein the computing device is an embedded computer system.

11. The computing device as recited in claim 7, wherein the computing device is a personal computer system.

* * * * *